F. GROCH.
APPARATUS FOR RECOVERING PULP FIBERS, &c., FROM LIQUIDS CONTAINING THEM.
APPLICATION FILED APR. 26, 1919.
1,312,976.
Patented Aug. 12, 1919.
4 SHEETS—SHEET 2.
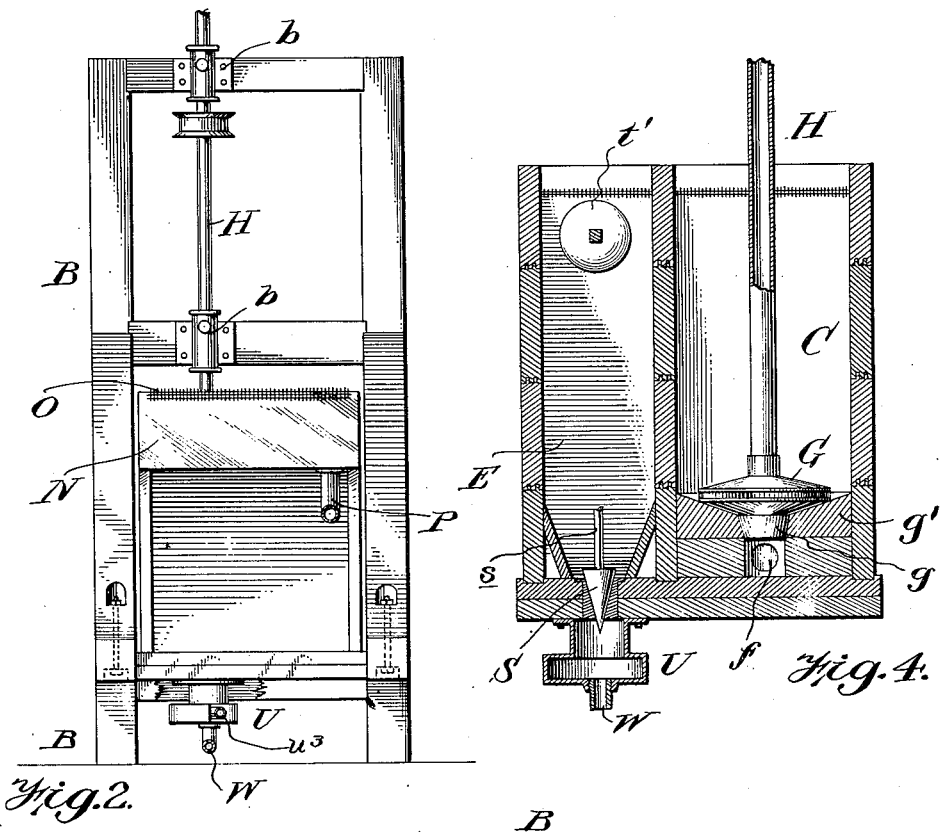
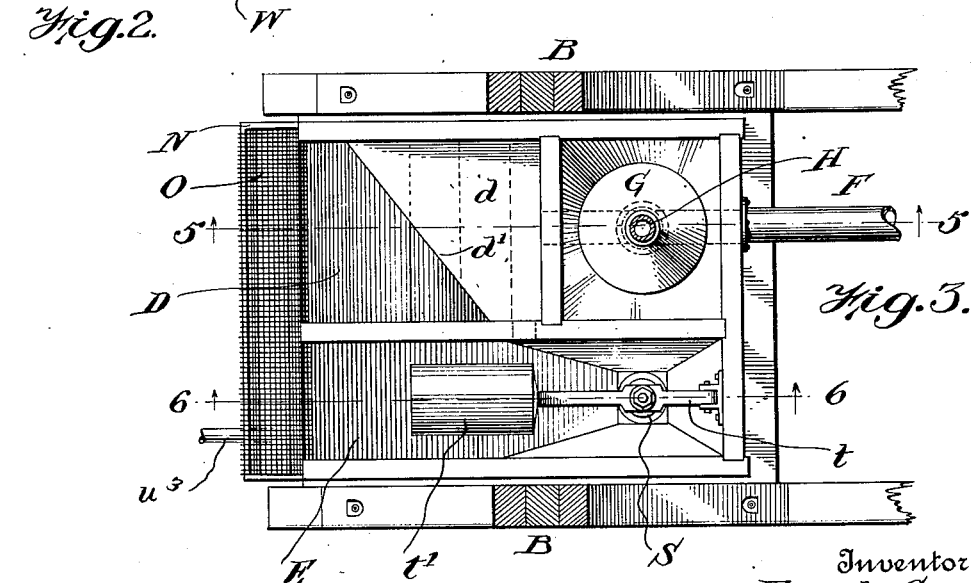
Inventor
Frank Groch
By his Attorneys F. GROCH.
APPARATUS FOR RECOVERING PULP FIBERS, &c., FROM LIQUIDS CONTAINING THEM.
APPLICATION FILED APR. 26, 1919.
1,312,976.
Patented Aug. 12, 1919.
4 SHEETS—SHEET 3.
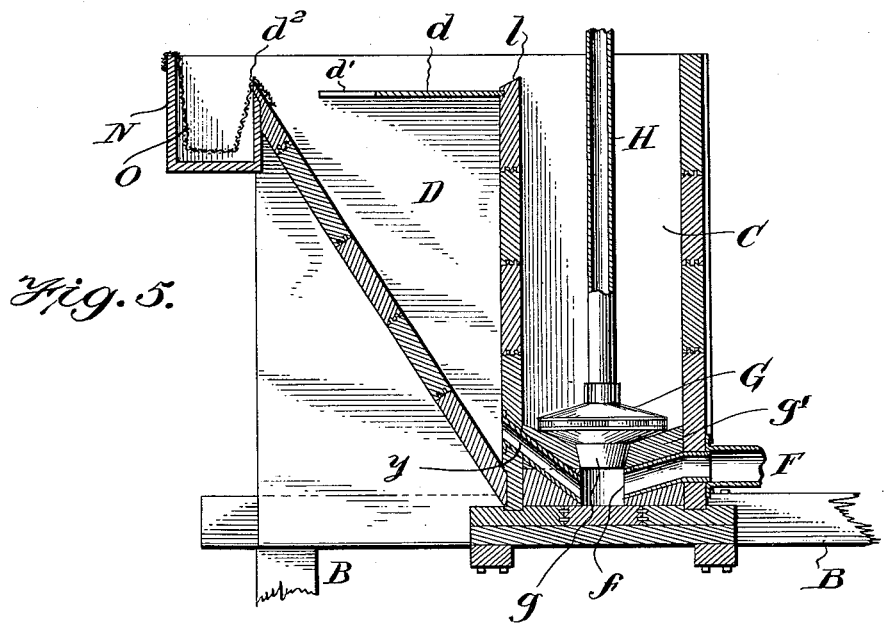
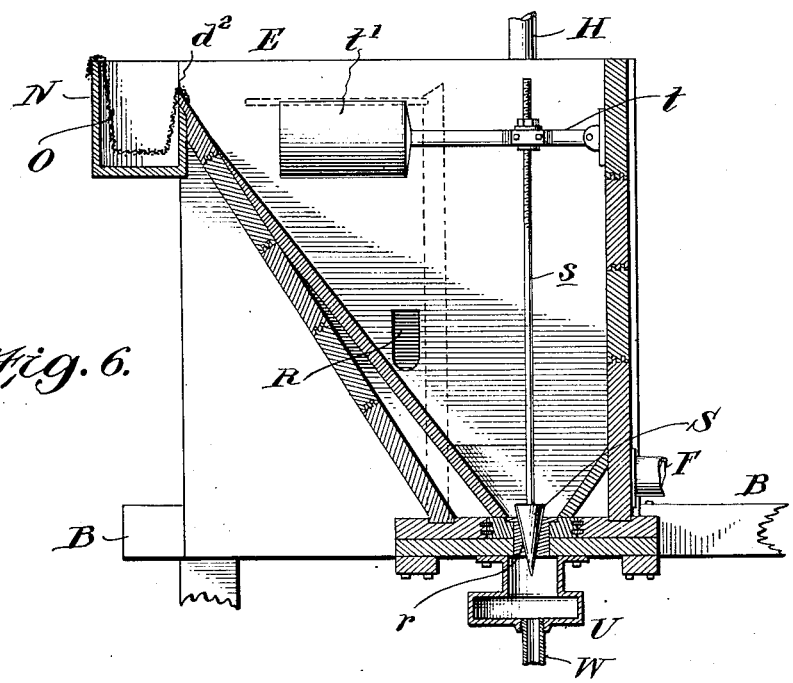
Inventor
Frank Groch
Witness
By his Attorneys

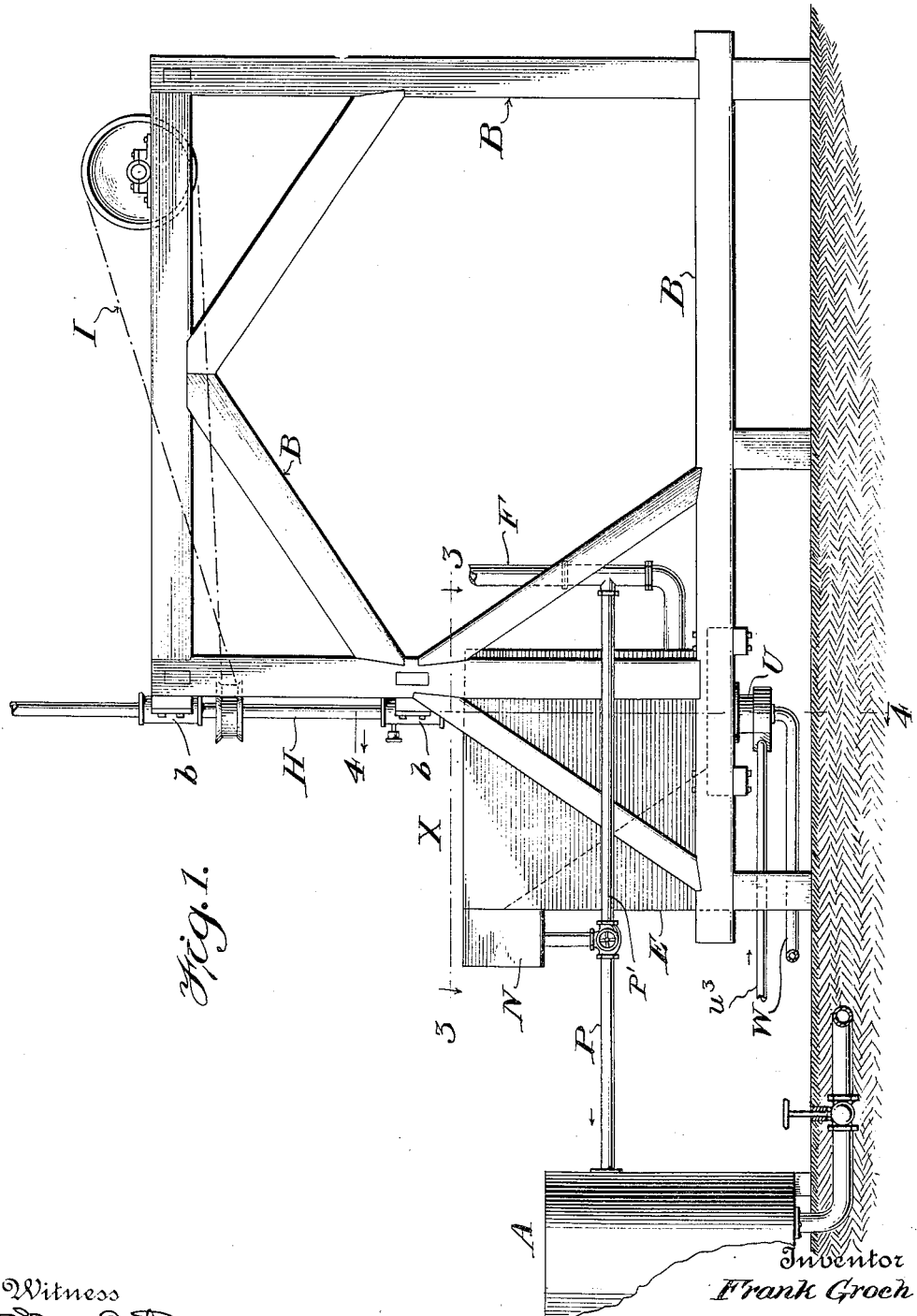

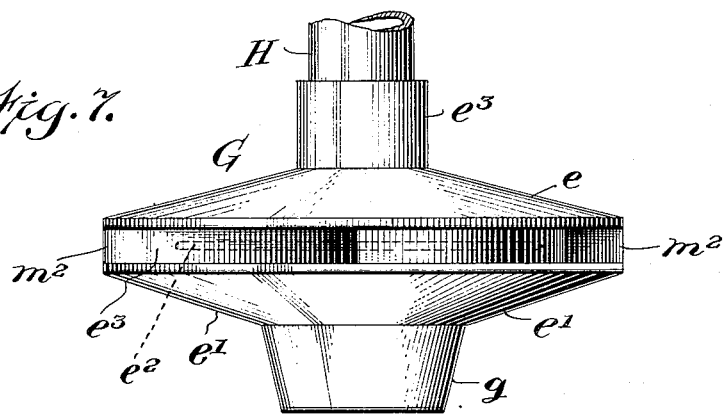
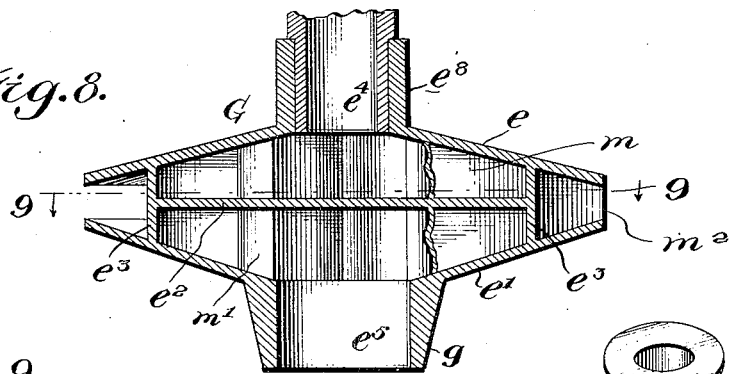
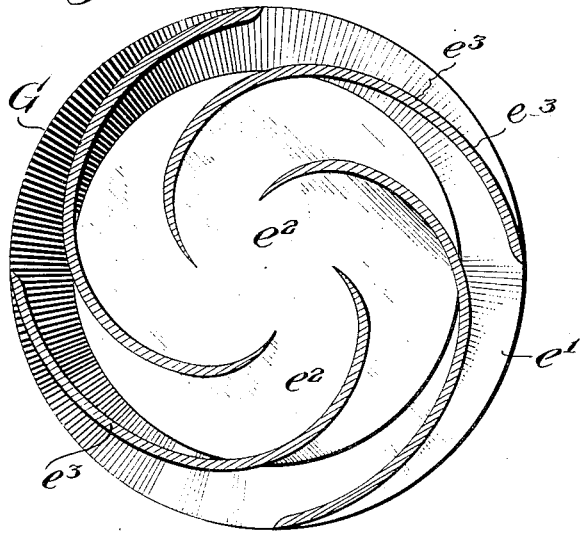
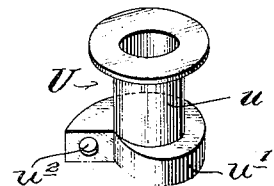
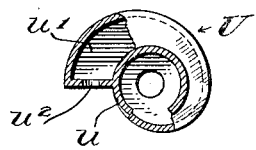

UNITED STATES PATENT OFFICE.

FRANK GROCH, OF COBALT, ONTARIO, CANADA.

APPARATUS FOR RECOVERING PULP FIBERS, &c., FROM LIQUIDS CONTAINING THEM.

1,312,976.     Specification of Letters Patent.     Patented Aug. 12, 1919.

Application filed April 26, 1919. Serial No. 292,942.

*To all whom it may concern:*

Be it known that I, FRANK GROCH, a citizen of the United States, residing in Cobalt, in the Province of Ontario and Dominion of Canada, have invented certain new and useful Improvements in Apparatus for Recovering Pulp Fibers, &c., from Liquids Containing Them, of which the following is a specification.

This invention relates particularly to apparatus for recovering wood and other fibrous material from the waste liquids in paper mills and also to apparatus which may be used for recovering valuable, or material worth saving, from waste liquids in soap making and other industrial plants.

Ordinarily paper mills are provided with what are called "save alls", to which the waste liquids from different parts of the plant or mill are conveyed and as these liquids contain wood fibers and other fibrous material which are worth saving, the liquids received by the "save all" are strained, filtered, or otherwise treated to separate the solids from the liquids. Where screens, perforated plates, filters, and the like are employed, they often become clogged or blinded and thus are made inefficient unless repeatedly cleaned.

I have found that separation of the solids from the liquids may be performed by centrifugal action combined with air flotation by an apparatus that requires no cleaning as in the case of separators involving the use of screens, filters, and the like.

According to my invention the waste liquids carrying fibrous or other valuable material are conveyed from a suitable source of supply, as for instance a save all vat, to an apparatus comprising an agitation chamber within which is mounted a rotary agitator or impeller into which the liquid is drawn and from which it is centrifugally discharged. Air is also admitted to the impeller and is discharged therefrom and commingled with the liquid in the agitation chamber. Air bubbles are thus formed and the particles of pulp which adhere thereto are raised or "ballooned" to the top of the chamber and overflow therefrom in a frothy liquid into an overflow chamber, from which they pass in the form of a froth or foam into a launder provided with a screen or filter, which effects the final separation of the solids from the liquid. The clear water passing through the screen may be carried back to the save all vat while the solid particles may be lifted out from the launder with the screen, or perforated plates may be employed in the launder and rakes or other suitable implement may be used to remove the solid particles or such frothy material may pass to a box containing a perforated plate or filter and the solid particles may be shoveled out from the box in any suitable way while the clear water may be returned to the system. The frothy material which overflows may, if preferred, be returned to the paper making circuit or the main circuit of the industrial plant where the apparatus is used.

Such liquid as passes over from the agitation chamber to the overflow chamber and does not pass to the launder is passed back to the impeller or agitator to be retreated for the recovery of solid particles. The overflow chamber communicates with an adjacent chamber provided with a discharge valve operated by a float so as to prevent overflow of the liquid from the apparatus and to maintain a constant liquid level therein. The discharge opening in the float chamber or discharge chamber communicates with what is known as a "vortex classifier" which causes the discharging liquid to whirl or rotate and while the discharge of clear liquid is not impeded solid particles are caused to rise in the discharge chamber and are held in suspension therein and passed therefrom to the impeller, or overflow with the froth into the launder or receiver at the upper part of the apparatus.

The lower portion of the overflow chamber is connected with the agitation chamber and returns the liquid thereto, and there is a connection between the overflow chamber and the discharge chamber whereby the liquid level in the several chambers is maintained uniform.

My improvements are illustrated in the accompanying drawings, in which:—

Figure 1 is a side elevation of an apparatus for saving wood pulp or the like, made in accordance with my invention.

Fig. 2 shows an end elevation of part of the apparatus looking from the left hand side of Fig. 1.

Fig. 3 shows a section on the line 3—3 of Fig. 1 and is mainly a plan view of that part of the apparatus embodying my improvements.

Fig. 4 shows a vertical section on the line 4—4 of Fig. 1.

Fig. 5 shows a vertical section on the line 5—5 of Fig. 3.

Fig. 6 is a similar section on the line 6—6 of Fig. 3.

Fig. 7 shows an elevation on an enlarged scale of the lower portion of the impeller.

Fig. 8 shows a vertical section thereof.

Fig. 9 shows a horizontal section of the impeller on the line 9—9 of Fig. 8.

Fig. 10 is a perspective view of the vortex classifier.

Fig. 11 is a view partly in plan and partly in section of the device shown in Fig. 10.

The separating apparatus may be connected in any suitable way to different parts of a paper mill—such as the screens, suction boxes, etc.—or it may be connected to any other suitable source of waste liquids from other industrial plants. The separating apparatus is indicated in Fig. 1 at X and is shown in detail in other parts of the drawings. It is supported on a suitable frame B and may be made of any suitable material such as wood. It comprises three chambers C, D, and E; C being the agitation chamber; D, the overflow chamber; and E, the discharge chamber. The agitation chamber is connected at its lower end to a supply pipe F and it contains a rotary agitator or impeller G, which communicates with the pipe F at $f$. Said impeller is secured to the lower end of a hollow shaft H through which air is drawn from the atmosphere and commingles with the liquid drawn into the chamber in the manner hereinafter described.

The impeller is provided with a hub or boss $g$ having a bearing in the stool $g'$ and it is also supported by bearings $b$ attached to the frame B. The impeller shaft may be rotated by gearing I as indicated.

In Figs. 7, 8, and 9 I have shown the details of the rotary agitator or impeller. It consists of upper and lower substantially conical walls $e$, $e'$ arranged in reversed relation, thereby providing a body that tapers toward its periphery. The upper wall has a hub $e^3$ that receives the lower end of the shaft H and provides an axial vertically disposed inlet opening $e^4$. The lower wall $e'$ of the impeller has a depending boss $g$, having an opening $e^5$ providing an axial inlet through the lower wall of the impeller. Interposed between the upper and lower walls, and spaced from both of these walls, is a horizontal partition plate $e^2$ that divides the interior of the impeller into an upper compartment $m$ and a lower compartment $m'$. The partition terminates short of the periphery of the impeller so that the two compartments are in communication with each other at their outer portions but within the body of the impeller and adjacent to the peripheral outlet opening $m^2$. Curved impeller blades $e^3$ are located in each compartment and are preferably in alinement, these blades having their inner ends either alined with the walls of the inlet openings or not, their outer ends, however, being extended beyond the periphery of the partition $e^2$ and terminating at the periphery of the impeller. As the impeller is rotated, liquid is drawn into the lower chamber $m'$ and air is drawn into the upper chamber $m$. Both air and liquid are thrown centrifugally outward from the impeller into the agitation chamber. The liquid and air commingle before being discharged from the impeller and air bubbles are formed to which the solid particles of wood pulp adhere, and these particles are raised or "ballooned" to the top of the agitation chamber, where a frothy mixture of air, solid particles, and liquid is formed. The agitation chamber overflows above the lip $l$ into the overflow chamber D. Said frothy material is first received by a platform $d$, preferably of the kind shown, and which preferably has a diagonal outer edge $d'$ as illustrated most clearly in Fig. 3. This platform terminates some distance from the outer edge $d^2$ of the overflow chamber, but it prevents the frothy material from settling directly into this chamber. N indicates an overflow launder, which, as shown in Fig. 5, may be provided with a wire screen O in basket form, but other forms of screens may be employed, or a filter box may be used. The frothy material is received by the screen which detains the solid particles. Clear liquid below the screen is carried away in any suitable way, preferably being conveyed to the supply pipe F by a pipe P' or if a filter box is employed the clear liquid may be carried by a pipe P to a receiving vat A.

The discharge chamber E communicates with the overflow chamber D by means of a passage R, shown most clearly in Fig. 6. Liquid below the partition $d$ passes from the overflow chamber to the discharge chamber through this opening and rises to the same level as that of the liquid in the overflow chamber. The discharge chamber has an inclined bottom as shown, which extends to a discharge opening $r$ provided with a valve S connected by a rod $s$ to a lever $t$ carrying a float $t'$. By means of this float valve the liquid level in the apparatus is maintained. When the liquid level rises, the valve is automatically opened and permits the passage of surplus liquid. U indicate what is known in the art as a "vortex classifier." This is shown more clearly in Figs. 10 and 11. It is applied to the discharge part of the apparatus and is for the purpose of producing a vortex by whirling or rotating the liquid in such manner as to cause the solid particles which may remain in the liquid to be raised, while the clear liquid is allowed to pass. By this means solid particles are thrown upward into the discharge chamber and find their way through the communicating opening R to the overflow chamber, and thus may pass with other solid particles in the overflow chamber through a channel $y$ back to the impeller for retreatment. It is understood, of course, that all solid particles are not held by the froth. Some of them descend in the overflow chamber, but these are drawn through the channel $y$ by the impeller and are retreated.

With regard to the vortex classifier it may be stated that as shown in Figs. 10 and 11 it comprises a body portion $u$ which communicates directly with the discharge opening of the apparatus, and which also communicates with a spirally arranged chamber $u'$ to which air or water under pressure, preferably water, is admitted at $u^2$ from a pipe $u^3$ shown in Fig. 1. A pipe W conveys the liquid discharged from the vortex classifier to any suitable receiver.

In the operation of the apparatus when used in a paper mill, waste liquid, containing tailings or particles of pulp or other substance to be saved, is conveyed by the pipe F to the impeller which is rotated at a high speed and which also receives air through the vertical shaft H. The rotation of the impeller creates sufficient centrifugal force to draw liquid to it and to also induce air without the use of pumps or compressors. The liquid is violently agitated in the agitation chamber, air bubbles are produced, and the floatable pulp particles and other such floatable matter, if there be any, are raised or "ballooned" in the liquid and caused to overflow onto the platform $d$. The frothy material, being lighter than the liquid, flows from the top of the liquid into the overflow launder N which may carry them away to a suitable receiver and where a screen or filter is employed the solid particles are caught, and the clear liquid is carried away. The liquid below the partition $d$ contains some remnants of pulp and other solid matter, and this liquid containing pulp, etc., is drawn through the channel $y$ by the impeller and retreated. The solid material caught in the screen may be removed in any suitable way. The manner in which the constant level is maintained in the apparatus has been already described. It will be observed that the apparatus is designed to separate from the waste liquids of paper mills and other industrial plants the valuable constituents thereof, whatever be their nature so long as they are such that they can, when mixed with air in the agitation chamber, be raised or ballooned to the top thereof, and pass therefrom in a froth which is separable from the liquid, and while the apparatus is particularly useful in separating particles of wood pulp from liquid containing them, it also operates to separate and save other substances which may be raised or ballooned in the agitator and may therefore be called floatable.

I have illustrated in the drawings a simple form of apparatus in which one impeller and one agitation chamber are employed, but these may be duplicated and may be combined in any suitable way to operate successively on portions of the liquid under treatment, that is to say, such material as does not overflow into the overflow launder, instead of being carried back to the same impeller may be conveyed to another chamber containing a second impeller and so on. The drawings, however, illustrate the principal features of my invention.

As before stated while I have described my invention as applied to a paper mill, it may be used in other industrial plants for the recovery of valuable substances from waste liquids.

What I claim is:—

1. Apparatus for separating floatable material from waste liquid, comprising an agitation chamber, a rotary impeller therein which by centrifugal action draws the waste liquid to it, an air supply pipe leading to the impeller, means for rotating the impeller to cause it to draw air and liquid thereinto and to discharge it therefrom into the agitation chamber, an overflow chamber communicating with the agitation chamber and into which the agitated liquid overflows, means in the overflow chamber for separating the floatable portion of the overflow liquid from the remainder thereof, a receiver for the floatable material, means for carrying away the clear liquid, and means for conveying a portion of the liquid in the overflow chamber back to the agitation chamber.

2. Apparatus for separating floatable material from waste liquid, comprising an agitation chamber, a rotary impeller therein, a liquid supply pipe leading to the bottom of the impeller, an air supply pipe leading to the top of the impeller, means for rotating the impeller to cause it to draw air and liquid thereinto and to discharge it therefrom into the agitation chamber, an overflow chamber into which the liquid passes from the agitation chamber, a receiver for the frothy portion of the liquid, means in the upper portion of the overflow chamber for guiding the froth to the receiver, means in the receiver for separating the solid particles from the liquid, means in the lower portion of the overflow chamber for conveying liquid therefrom, and means for conveying the liquid separated from the froth in the receiver to the liquid supply pipe of the impeller.

3. Apparatus for separating floatable material from waste liquid, comprising an agitation chamber, a rotary impeller therein which by centrifugal action draws the waste liquid to it, an air supply pipe leading to the impeller, means for rotating the impeller to cause it to draw air and liquid thereinto and discharge it therefrom into the agitation chamber, an overflow chamber into which froth containing solid particles passes from the agitation chamber, a platform in the upper part of the overflow chamber over which the froth passes, means for receiving the froth from the overflow chamber, and means for carrying away the relatively clear liquid below said partition.

4. Apparatus for separating floatable material from waste liquid, comprising an agitation chamber, a rotary impeller therein which by centrifugal action draws the waste liquid to it, means for rotating the impeller to cause it to draw the waste liquid thereinto and discharge it therefrom into the agitation chamber, an overflow chamber into which froth containing solid particles passes from the agitation chamber, a platform in the upper part of the overflow chamber having an inclined or diagonal edge over which the froth passes, a launder for receiving the froth from the overflow chamber, and means for carrying away the relatively clear liquid from the overflow chamber.

5. Apparatus for separating floatable material from waste liquid, comprising an agitation chamber, a rotary impeller therein which by centrifugal action draws the waste liquid to it, means for rotating the impeller to cause it to draw liquid thereinto and discharge it therefrom into the agitation chamber, an overflow chamber into which froth containing solid particles passes from the agitation chamber, means for receiving the froth from the overflow chamber, and a connection between the overflow chamber and the lower portion of the agitation chamber below the impeller whereby some of the liquid received by the overflow chamber may be returned to the agitator for retreatment.

6. Apparatus for separating floatable material from waste liquid, comprising an agitation chamber, a rotary impeller therein which by centrifugal action draws the waste liquid into it and discharges it therefrom into the agitation chamber, an overflow chamber into which the froth containing solid particles passes from the agitation chamber, means for receiving the froth from the overflow chamber, a communication between the overflow chamber and the agitation chamber through which a portion of the liquid in the overflow chamber passes to said agitation chamber, a discharge chamber communicating with the lower portion of the overflow chamber, and a float valve governing the discharge of liquid from the discharge chamber.

7. Apparatus for separating floatable material from waste liquid, comprising an agitation chamber, a rotary impeller therein which by centrifugal action draws the waste liquid to it, means for rotating the impeller to cause it to draw air and liquid thereinto and discharge it therefrom into the agitation chamber, an overflow chamber into which froth containing solid particles passes from the agitation chamber, a platform in the upper part of the overflow chamber over which the froth passes, means for receiving the froth from the overflow chamber, a channel connecting the lower portion of the overflow chamber with the lower portion of the agitation chamber, a discharge chamber, a float valve governing discharge therefrom, and means associated with the exit opening of the discharge chamber for giving a rotary motion to the liquid while being discharged.

In testimony whereof, I have hereunto subscribed my name.

FRANK GROCH.